(12) United States Patent
Wulff et al.

(10) Patent No.: US 9,879,150 B2
(45) Date of Patent: Jan. 30, 2018

(54) NON-AQUEOUS SOUND-DEADENING COMPOSITION CONTAINING A NON-PULVERULENT POLYACRYLATE BINDER AND A RADICALLY POLYMERIZABLE COMPOUND

(71) Applicant: BASF SE, Ludwigshafen (DE)

(72) Inventors: Dirk Wulff, Schifferstadt (DE); Ulrike Licht, Mannheim (DE); Peter Preishuber-Pfluegl, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/306,946

(22) PCT Filed: Apr. 17, 2015

(86) PCT No.: PCT/EP2015/058363
§ 371 (c)(1),
(2) Date: Oct. 26, 2016

(87) PCT Pub. No.: WO2015/165753
PCT Pub. Date: Nov. 5, 2015

(65) Prior Publication Data
US 2017/0051175 A1 Feb. 23, 2017

(30) Foreign Application Priority Data
Apr. 29, 2014 (EP) .................................. 14166361

(51) Int. Cl.
| | |
|---|---|
| *C09D 4/06* | (2006.01) |
| *G10K 11/162* | (2006.01) |
| *C09D 133/08* | (2006.01) |
| *C09D 133/02* | (2006.01) |
| *C08K 3/00* | (2006.01) |

(52) U.S. Cl.
CPC ............. *C09D 133/08* (2013.01); *C09D 4/06* (2013.01); *C09D 133/02* (2013.01); *G10K 11/162* (2013.01); *C08K 3/0033* (2013.01); *C08L 2201/56* (2013.01)

(58) Field of Classification Search
CPC ..................................... C09D 4/06; C09J 4/06
USPC ........................................................ 524/556
See application file for complete search history.

(56) References Cited

U.S. PATENT DOCUMENTS

| | | | | |
|---|---|---|---|---|
| 3,776,871 A | * | 12/1973 | Bader et al. | .......... C04B 41/483 |
| | | | | 524/128 |
| 2009/0324945 A1 | | 12/2009 | Licht et al. | |
| 2012/0027941 A1 | | 2/2012 | Fonseca et al. | |
| 2015/0097136 A1 | | 4/2015 | Wulff et al. | |

FOREIGN PATENT DOCUMENTS

| | | |
|---|---|---|
| DE | 10 2006 052 282 A1 | 5/2008 |
| EP | 1 520 865 A2 | 4/2005 |
| EP | 1 935 941 A1 | 6/2008 |
| EP | 2 420 412 A1 | 2/2012 |
| JP | 2001-247744 A | 9/2001 |
| WO | WO 01/90264 A1 | 11/2001 |
| WO | WO 2007/034933 A1 | 3/2007 |
| WO | WO 2008/049805 A1 | 5/2008 |
| WO | WO 2008/049932 A1 | 5/2008 |
| WO | WO 2012/168208 A1 | 12/2012 |
| WO | WO 2013/174611 A1 | 11/2013 |

OTHER PUBLICATIONS

International Search Report and Written Opinion of the International Searching Authority dated Jul. 15. 2015 in PCT/EP2015/058363 filed Apr. 17, 2015.

\* cited by examiner

*Primary Examiner* — Vu A Nguyen
(74) *Attorney, Agent, or Firm* — Oblon, McClelland, Maier & Neustadt, L.L.P.

(57) ABSTRACT

A description is given of a nonaqueous sound deadener composition comprising (a) a nonpulverulent polyacrylate binder having a K value in the range from 10 to 35, measured as a 1% strength solution in tetrahydrofuran; (b) inorganic fillers; and a radically polymerizable compound which has at least one radically polymerizable C—C double bond and possesses a boiling point at atmospheric pressure of greater than 160° C. Also described is a method for damping oscillations or vibrations of components of vehicles and machines, using the sound deadener composition of the invention.

43 Claims, No Drawings

NON-AQUEOUS SOUND-DEADENING COMPOSITION CONTAINING A NON-PULVERULENT POLYACRYLATE BINDER AND A RADICALLY POLYMERIZABLE COMPOUND

The invention relates to a nonaqueous sound deadener composition comprising (a) a nonpulverulent polyacrylate binder having a K value in the range from 10 to 35, measured as a 1% strength solution in tetrahydrofuran; (b) inorganic fillers; and a radically polymerizable compound which has at least one radically polymerizable C—C double bond and possesses a boiling point at atmospheric pressure of greater than 160° C. The invention also relates to a method for damping oscillations or vibrations of components of vehicles and machines. The polyacrylate binders can be used as a raw material for producing coating compositions for automaking, for example, that are suitable for damping noise and vibration.

Oscillating vehicle parts such as the engine, tires or transmission, for example, give rise to bodywork vibrations that can lead to unpleasant booming noises within the passenger compartment. For this reason, vibration damping systems are applied in a targeted way to those areas of the bodywork that are affected. These systems are intended to damp the bodywork vibrations that arise. The principal damping system used in Europe comprises bitumen mats, which in a labor-intensive workstep must be installed in the bodywork and bonded adhesively by hand. Used now for a few years have been, alternatively, pumpable and sprayable compositions, known as LASD (liquid applied sound damping) compositions, which can be applied rapidly and precisely by spraying robots. In comparison to bitumen mats, this technology allows the vehicle manufacturer to achieve a weight saving, on the basis of the higher damping efficiency of sprayable systems. Also possible is a reduction in costs for personnel, logistics, and warehousing, with an attendant reduction in the space taken up and the dust burden arising on the production line.

LASD compositions of this kind comprise not only fillers, which serve for reducing costs and for enhancing damping, but also polymeric fractions. Depending on the form in which they are present, these systems can be divided into aqueous and nonaqueous LASD systems. The polymeric fraction of aqueous LASD compositions is based chiefly on polyacrylate dispersions. The polyacrylate first fulfills the function of the binder, and also ensures the desired damping properties through copolymerization, with styrene or vinyl acetate, for example, or through mixing with other polymers, such as polyurethane, PVC plastisol, silicones or epoxide polymers, for example. By this means it is possible to set desired performance properties such as, for example, damping characteristics or water absorption. Furthermore, dispersions allow a low viscosity in tandem with high solids contents and pseudoplastic behavior on the part of the LASD compositions. This enables spray application at high shearing rates, while in the resting state the composition retains dimensional stability, without flowing.

The polymeric fraction of nonaqueous LASD compositions is very often based on rubbers, epoxy resins, PVC plastisols, polyurethanes or acrylate powders. The compositions on this basis become fluid by virtue of the melting of the polymers, and are applied to the substrate by subsequent spraying. Compositions which can be applied at room temperature often include plasticizers or low-viscosity binders to allow their processing. These variants require subsequent crosslinking with, for example, epoxidized silanes, peroxides, or reaction to polyurethanes, in order to obtain sufficient dimensional stability. Nonaqueous LASD compositions have the advantage that in the drying stages of the coating plant they usually solidify more rapidly and do not, as with the aqueous LASD compositions, generate water vapor, which can lead to unwanted cracking and blistering. Moreover, nonaqueous LASD compositions exhibit good stability toward moisture, and a high abrasion resistance. A disadvantage, in the case of epoxy resins, for example, may be a severe contraction, which can lead to a distortion in the metal vehicle panel. PVC plastisols have the disadvantage that they contain chlorine, a factor which is frequently undesirable.

Systems based on polyacrylate powders or on polyacrylate plastisols have the disadvantage that they generally use core-shell resins in combination with relatively large amounts of plasticizers, making these systems relatively expensive. The required shell of the polymer particles, moreover, generally has a relatively high glass transition temperature, and this may result in a limit on the damping efficiency of the damping composition at higher temperatures. Furthermore, the acrylate powders are generally prepared by emulsion polymerization followed by spray drying, and the emulsifiers used for the emulsion polymerization may remain in the polymer powders and migrate to the surface following application, and may detract from the adhesion of the damping composition to the metal. Acrylate plastisols, furthermore, comprise a large amount of plasticizer relative to the mass of solids, and the plasticizer makes no contribution to the damping effect. The result is a relatively low damping effect per unit mass.

Aqueous LASD compositions based on acrylate dispersions are notable for good damping qualities. Aqueous systems are described in EP 1935941, for example. Vibration-damping compositions based on waterborne polymer dispersions and inorganic fillers and also further auxiliaries are known from EP 1520865, WO 2007/034933, WO 01/90264, DE 10 2006 052 282, EP 2420412, and US2012/027941.

An improvement in damping efficiency gives the automakers the possibility to realize a weight saving in comparison to bitumen mats and nonaqueous LASD compositions. In addition, the good toxicological properties of dispersions mean that they are not hampered by safety concerns, and can be processed without additional protective equipment. A disadvantage in the case of applied and dried compositions, however, is a high water absorption, which can lead to an alteration in the properties and which jeopardizes the stability and long life of the applied and dried LASD compositions. Triggers for this tendency toward water absorption include capillary forces on the part of the porous composition, and also hydrophilic auxiliaries such as emulsifiers, dispersing assistants or stabilizers. Damping systems are used not only in the vehicle interior but also in the exterior area, such as wheel housings, engine compartment or cold box. These areas are subject to high humidity. The vibration-damping systems used there thus need to have a high resistance toward water absorption. Consequently, these areas have hitherto been inaccessible to water-based LASD compositions.

Bitumen compositions, though offering very low water absorption, have a relatively poor damping effect relative to the applied weight. Also known are water-free, sprayable systems based on rubber compositions. These compositions, however, have to be vulcanized with sulfur, and this may lead to odor problems.

A major challenge for formulators of LASD compositions is posed, alongside the water absorption, by blistering during drying. The water evaporates from the composition in the drying tunnels of the coating plant. If there is a water vapor barrier in the composition as it dries, the result may be cracking and blistering. In this case, compositions may lift from the bodywork and fail to achieve sufficient vibration damping as a result of inadequate contact with the surface.

Moreover, such blistering proves to be a serious manufacturing defect, since it alters the dimensions of the noise damping compositions and thus removes the possibility of uniform operation.

WO 2011/174611 describes nonaqueous LASD compositions based on solvent-free polyacrylate binders. Because of the viscosity at room temperature, these compositions are still not ideally suitable for spraying applications.

The object is to provide sound deadener compositions which are extremely good for spraying applications, having extremely low viscosities at room temperature, and at the same time exhibit an extremely broad damping value curve and extremely high damping values (based on application weight and solids content of the LASD compositions). Moreover, extremely good performance properties are to be achieved in respect of low water absorption on the part of applied LASD compositions, and also in relation to the problem of blistering and cracking in the drying tunnel.

It has been found that the object is achieved by means of a nonaqueous sound deadener composition comprising
(a) at least one nonpulverulent polyacrylate binder having a K value in the range from 10 to 35, measured as a 1% strength solution in tetrahydrofuran at 21° C.; and
(b) inorganic fillers, and
(c) at least one radically polymerizable compound which has at least one radically polymerizable C—C double bond and possesses a boiling point at atmospheric pressure of greater than 160° C., preferably greater than 180° C.

One preferred use for the sound deadener composition of the invention is for vibration damping of bodywork parts of a vehicle.

The term "nonaqueous" means more particularly that no aqueous polymer dispersions are used in preparing the sound deadener compositions.

The sound deadener composition is preferably solvent-free or of low solvent content in the sense that it constitutes a system of the kind known as "100% systems", where the polymeric binder is used in bulk, in other words not in solution in a low-boiling, volatile organic solvent, or in the sense that low-boiling, volatile organic solvents are present only in small amounts of, for example, in total not more than 5% by weight or not more than 1% by weight and more preferably not more than 0.1% by weight. Low-boiling organic solvents are organic solvents having a boiling point at atmospheric pressure (1013 mbar) of less than 120° C.

Polyacrylate binders are binders based on polymers which are composed predominantly, i.e., to an extent of more than 50% by weight, of (meth)acrylic esters. The expression "(meth)acryl . . . " is an abbreviated notation for "acryl . . . or methacryl . . . ".

The polyacrylate binders for use in accordance with the invention are polymers having comparatively low, limited molecular weights, and are fluid at least on gentle heating and have a sufficiently low viscosity to allow them to be applied effectively to the substrates that are to be coated. One measure of the molecular weights is the K value (Fikentscher constant). The K value, also referred to as intrinsic viscosity, is a parameter which is easily determined via viscosity measurements of polymer solutions, and under standardized measurement conditions is solely dependent on the average molar mass of the sample under analysis. The K values of the polyacrylate binders are in the range from 10 to 35, preferably 10 to 25, measured as a 1% strength solution in tetrahydrofuran at 21° C.

The glass transition temperature (Tg) of the polyacrylate binder is preferably −60 to +80° C., more preferably from −30 to less than or equal to +60° C. The glass transition temperature can be determined by customary methods such as Differential Scanning calorimetry (ASTM 3418-08, the midpoint temperature). The nature and amount of the monomers are such that the glass transition temperature of the polyacrylate binder lies within the specified range.

The zero-shear viscosity of the polyacrylate binder at 130° C. is preferably not more than 40 Pa s, or not more than 20 Pa s, or not more than 10 Pa s, e.g., 1 to 40 Pa s or 1 to 20 Pa s or 1 to 10 Pa s.

Preferred polyacrylate binders are obtainable by polymerization of radically polymerizable acrylate monomers, a term which is understood to include methacrylate monomers, and optionally further, copolymerizable monomers. The polymers are formed preferably to an extent of at least 60%, very preferably at least 80%, by weight from $C_1$ to $C_{10}$ alkyl (meth)acrylates and optionally from further monomers. Mention may be made more particularly as (meth)acrylate monomers of C1-C8 alkyl (meth)acrylates, examples being methyl (meth)acrylate, ethyl (meth)acrylate, n-butyl (meth)acrylate, and 2-ethylhexyl (meth)acrylate. The alkyl (meth)acrylates preferably also comprise polyethylenically unsaturated, radically polymerizable monomers, more particularly those monomers which have further acrylic or nonacrylic, crosslinkable C—C double bonds (crosslinkable groups for short). Crosslinkable double bonds are more particularly those which are radically polymerizable with other double bonds (that is, which crosslink by radical polymerization), or those which form radicals by elimination of a hydrogen atom (in other words, which crosslink by reactions of these radicals). Examples of crosslinkable groups contemplated include the allyl group or cyclic hydrocarbon groups having at least one nonaromatic C—C double bond. The cyclic hydrocarbon group is more particularly a dihydrodicyclopentadienyl group of the formula:

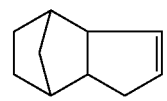

I

Examples include allyl (meth)acrylate, butanediol di(meth)acrylate, or monomers having a (meth)acryloyl group and a dihydrodicyclopentadienyl group. The (meth)acryloyl group may be bonded directly or indirectly, in other words via an organic group as spacer, to the dihydrodicyclopentadienyl group; preference is given to dihydrodicyclopentadienyl (meth)acrylate of the following formulae:

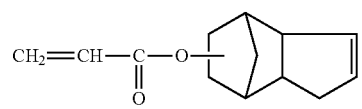

II

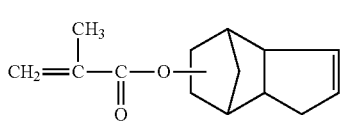

Monomers which as well as the first acrylic double bond also carry a further ethylenic double bond, preferably a nonacrylic bond, are able to improve the connection between the polyacrylate binder and the radical polymerizable compound in the course of curing (drying) and hence to improve the damping efficiency of the damping compound.

Further, nonacrylate monomers of which the polyacrylate binder may additionally be composed, are, for example, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and 1 or 2 double bonds, or mixtures of these monomers. Examples of vinylaromatic compounds contemplated include vinyltoluene, α- and p-methylstyrene, alpha-butylstyrene, 4-n-butylstyrene, 4-n-decylstyrene, and preferably styrene. Examples of nitriles are acrylonitrile and methacrylonitrile. The vinyl halides are chlorine-, fluorine- or bromine-substituted ethylenically unsaturated compounds, preferably vinyl chloride and vinylidene chloride. Examples of vinyl ethers include vinyl methyl ether and vinyl isobutyl ether. Preferred vinyl ethers are those of alcohols comprising 1 to 4 C atoms. Hydrocarbons having 2 to 8 C atoms and two olefinic double bonds include butadiene, isoprene, and chloroprene.

Further monomers contemplated also include, in particular, ethylenically unsaturated, radically polymerizable acid monomers, examples being monomers having carboxylic, sulfonic or phosphonic acid groups. Carboxylic acid groups are preferred. Examples include acrylic acid, methacrylic acid, itaconic acid, maleic acid, and fumaric acid. Further monomers are also, for example, (meth)acrylamide and monomers comprising hydroxyl groups, especially C1-C10 hydroxyalkyl (meth)acrylates. Mention may further be made of phenyloxyethyl glycol mono(meth)acrylate, glycidyl acrylate, glycidyl methacrylate, amino (meth)acrylates such as 2-aminoethyl (meth)acrylate. Monomers which in addition to the double bond also carry further functional groups, e.g., isocyanate-, amino-, hydroxy-, amide- or glycidyl-, may have the effect, for example, of improving the adhesion to substrates.

The further monomers are preferably selected from ethylenically unsaturated, radically polymerizable acid monomers, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

The polyacrylate binders may be prepared by copolymerizing the monomeric components using the customary polymerization initiators and also, optionally, regulators, and carrying out polymerization at the customary temperatures in bulk, in emulsion, e.g., in water or liquid hydrocarbons, or in solution. It is preferred to prepare the polyacrylate binders by polymerizing the monomers in organic solvents, more particularly in organic solvents having a boiling range of 50 to 150° C., preferably of 60 to 120° C., using the customary amounts of polymerization initiators, this being generally 0.01% to 10%, more particularly 0.1% to 4%, by weight, based on the total weight of the monomers.

The copolymers can be prepared at temperatures of 20 to 150° C., preferably at temperatures in the range from 70 to 120° C., and at pressures of 0.1 to 100 bar (absolute), preferably at 0.3 to 10 bar, in the presence of 0.01% to 10% by weight of peroxides or azo compounds as polymerization initiators, based on the monomers, and in the presence of 0% to 200% by weight of inert solvents, preferably of 5% to 25% by weight, based on the monomers, i.e., by solution polymerization or bulk polymerization. The reaction takes place preferably under increasingly reduced pressure, as for example by lowering of the pressure from atmospheric pressure (1 bar) to 500 mbar (absolute). Examples of solvents are hydrocarbons such as toluene or o-xylene, alcohols such as methanol, ethanol, propanol, butanol, and isobutanol, ketones such as acetone, methyl ethyl ketone and methyl isobutyl ketone, ethyl acetate, nitriles such as acetonitrile and benzonitrile, or mixtures of the stated solvents.

Examples of polymerization initiators contemplated include azo compounds, ketone peroxides, and alkyl peroxides, examples being acyl peroxides such as benzoyl peroxide, dilauroyl peroxide, didecanoyl peroxide, and isononanoyl peroxide, alkyl esters such as tert-butyl perpivalate, tert-butyl per-2-ethyl hexanoate, tert-butyl permaleate, tert-butyl perisononanoate, tert-butyl perbenzoate, and tert-amyl per-2-ethylhexanoate, dialkyl peroxides such as dicumyl peroxide, tert-butyl cumyl peroxide, and di-tert-butyl peroxide, and peroxodicarbonates. As initiators it is further possible for azo starter compounds to be used, such as 2,2'-azobisisobutyronitrile, 2,2'-azobis(methyl isobutyrate) or 2,2'-azobis(2,4-dimethylvaleronitrile), for example.

For implementing the polymerization it is also possible to add compounds that lower the degree of polymerization, known as chain transfer agents, to the reaction mixture, in amounts for example of 0.1 to 0.8 part by weight, based on 100 parts by weight of the monomers to be polymerized. Examples of suitable compounds are those having a thiol group, as for example mercaptans such as mercaptoethanol, tert-butyl mercaptan, mercaptosuccinic acid, ethylhexyl thioglycolate, 3-mercaptopropyltrimethoxysilane or dodecyl mercaptan. In one embodiment no chain transfer agents are used.

The polyacrylate binder is preferably prepared
(a1) to an extent of at least 80% by weight from C1 to C10 alkyl (meth)acrylates and
(a2) to an extent of 0.5% to 20% by weight from monomers having polar groups, the polar groups being selected from carboxylic acid groups, carboxamide groups, pyrrolidone groups, urethane groups, urea groups, anhydride groups, sulfate groups, sulfonate groups, phosphate groups, and phosphonate groups.

A particularly preferred polyacrylate binder is prepared from methyl (meth)acrylate (preferably methyl methacrylate), at least one C2 to C4 alkyl acrylate (preferably n-butyl acrylate), (meth)acrylic acid (preferably acrylic acid), and (meth)acrylic esters with an additional, nonacrylic double bond (preferably dihydrodicyclopentadienyl acrylate), e.g.
(i) 0% to 99% by weight, preferably 10% to 50% by weight, of methyl (meth)acrylate (preferably methyl methacrylate),
(ii) 0% to 99% by weight, preferably 30% to 75% by weight, of at least one C2 to C10 alkyl acrylate (preferably n-butyl acrylate), and (iii) 0.5% to 15% by weight, preferably 1% to 10% by weight, of (meth)acrylic acid (preferably acrylic acid), (iv) 0% to 25% by weight, preferably 0.1% to 10% by weight, of a polyethylenically unsaturated alkyl acrylate (preferably allyl methacrylate or dihydrocyclopentadienyl acrylate), and (v) 0% to 30% by weight of styrene.

In contrast to known acrylate plastisols there is no need for the acrylate binders to be polymer particles having a core-shell morphology; preferably, therefore, they do not have a core-shell morphology.

The sound deadener composition of the invention comprises at least one radically polymerizable compound (c), which has at least one radically polymerizable C—C double bond and possesses a boiling point at atmospheric pressure of greater than 160° C., preferably greater than 180° C. This compound (c) acts like what is called a reactive diluent. A reactive diluent is a reactive dilution agent or a reactive solvent which is able to become part of the coating by chemical reaction in the course of film formation or drying. It may comprise monomers or oligomers having in each case one, two, three or more functionalities (C—C double bonds), examples being mono-, di- or tri(meth)acrylates, with oligomers being compounds composed preferably of 2 to 10 monomer units.

In one embodiment the compounds (c) have precisely one radically polymerizable C—C double bond to an extent of 50% to 100% by weight, and have two or more radically polymerizable C—C double bonds to an extent of 0% to 50% by weight.

Suitable compounds (c) are, for example, selected from (meth)acrylate monomers, vinyl ether monomers, (meth)acrylate oligomers, vinyl ether oligomers, mono-, di- or polyalkylene glycol diacrylates having preferably 1 to 6, more particularly 2 or 3, C atoms in the alkylene group, urethane acrylates, or a mixture thereof.

The radically polymerizable compounds (c) have in the polymerized state preferably a glass transition temperature in the range from −30 to +60° C.

To support or induce the polymerization of the polymerizable compounds (c) following application of the sound deadener composition, the composition preferably further comprises at least one thermally activatable initiator. On increase in temperature, the initiator initiates a radical polymerization reaction.

Suitable thermal initiators are those which find application in radical polymerization, such as, for example, azo compounds, ketone peroxides, and alkyl peroxides, examples being acyl peroxides such as benzoyl peroxide, dilauroyl peroxide, didecanoyl peroxide, and isononanoyl peroxide, alkyl esters such as tert-butyl perpivalate, tert-butyl per-2-ethylhexanoate, tert-butyl permaleate, tert-butyl perisononanoate, tert-butyl perbenzoate, and tert-amyl per-2-ethylhexanoate, dialkyl peroxides such as dicumyl peroxide, tert-butyl cumyl peroxide, 1,1-di(tert-butylperoxy)-3,3,5-trimethylcyclohexane, di-tert-butyl peroxide, and peroxodicarbonates. As initiators it is further possible for azo starter compounds to be used, such as 2,2'-azobisisobutyronitrile, 2,2'-azobis(methyl isobutyrate) or 2,2'-azobis(2,4-dimethylvaleronitrile), for example.

Preferred initiators are those which have a half-life of greater than or equal to one hour at 100° C. Very preferred initiators are those provided on an inorganic support, an example being 1,1-di(tert-butylperoxy)-3,3,5-trimethylcyclohexane, powder, 40% on calcium carbonate and silica.

Preferred amounts of thermal initiator are 0.01% to 10% by weight, based on the sound deadener composition, more preferably from 0.1% to 5% by weight.

For the purpose of optimizing the rheological and performance properties, the sound deadener composition may comprise at least one nonreactive, inert organic film-forming assistant which is liquid at room temperature (20° C.) and has a boiling point of greater than 160° C. Examples of suitable film-forming assistants are ethylene glycol, polyethylene glycols, ethylene glycol alkyl ethers (e.g., Cellosolve® products), diethylene glycol alkyl ethers (e.g., Carbitol® products), carbitol acetate, butyl carbitol acetate, hydrocarbons, or mixtures thereof; polypropylene glycol esters, polypropylene glycol ethers; and plasticizers such as esters of cyclohexanedicarboxylic acid and phthalic esters. Preferred film-forming assistants with high boiling point have a low viscosity at room temperature (20° C.), preferably of less than 50 mPa s. Preferred film-forming assistants are polyethylene glycol, oligopropylene glycol esters or oligopropylene glycol ethers having a boiling point of greater than 160° C., where "oligo" stands for 2 to 10 monomer units.

The film-forming assistants with a boiling point at atmospheric pressure of greater than 160° C. are preferably included in an amount of less than 20% by weight, as for example from 0% to less than 20% by weight or from 1% to less than 10% by weight, preferably not more than at 5% by weight or not more than at 1% by weight, and more preferably not more than at 0.1% by weight.

Solvents having a boiling point at atmospheric pressure of less than 120° C. are preferably included in an amount of less than 10% by weight or less than 5% by weight, as for example from 0% to less than 10% by weight or from 0% to less than 5% by weight or from 1% to less than 10% by weight or from 1% to less than 5% by weight.

Suitable solvents with boiling point of less than 120° C. are, for example, acetone, methyl ethyl ketone, and lower alcohols having preferably 1 to 4 C atoms such as methanol, ethanol, n-propanol, and isopropanol.

The sound deadener composition of the invention is preferably solvent-free, meaning that it comprises no organic solvents—or at any rate less than 1% by weight or less than 0.1% by weight of such solvents—with a boiling point of less than 120° C.

The sound deadener composition of the invention comprises preferably (a) 5% to 35% by weight, preferably 10% to 20% by weight, of the polyacrylate binder, (b) 40% to 90% by weight, preferably 60% to 80% by weight, of inorganic fillers, and (c) 1% to 35% by weight of the radically polymerizable compound, (d) 0.01% to 10% by weight of initiator, (e) from 0% to 20% by weight of film-forming assistants with boiling point of greater than 160° C., and (f) 0% to 50% by weight, preferably 0.1% to 20% by weight, of auxiliaries.

If film-forming assistants are used, preference is given to using 0.3 to 60 parts by weight or 3 to 25 parts by weight of film-forming assistants per 100 parts by weight of polyacrylate binder.

Examples of suitable inorganic fillers include calcium carbonate, kaolin, mica, silica, chalk, microdolomite, finely ground quartz, talc, clay, barium sulfate, alumina, iron oxide, titanium dioxide, glass powders, glass flakes, magnesium carbonate, aluminum hydroxide, bentonite, fly ash, kieselguhr, perlite, and mica. It is preferred to use flakelike fillers such as mica, for example, alone or in combination with typical inorganic pigments such as calcium carbonate, kaolin, silica or talc. Preferred fillers are kaolin, chalk, barium sulfate, carbon black, graphite, talc, clay minerals, microdolomite, finely ground quartz, and mica.

It is preferred to use 50 to 700 or 100 to 600 parts by weight of inorganic filler to 100 parts by weight of polyacrylate binder, and preferably 30 to 150 or 40 to 120 parts by weight of flakelike fillers are used per 100 parts by weight of polyacrylate binder.

Examples of auxiliaries, which are used preferably to an extent of at least 0.1% by weight, from 0.2% to 5% by weight for example, include crosslinkers, thickeners, rheological additives, resins, plasticizers, organic and inorganic pigments, stabilizers, wetting agents, preservatives, foam inhibitors, glass or plastics beads, hollow glass or plastics bodies, antifreeze agents, dispersants, antioxidants, UV absorbers, antistats, and pigment dispersants. Among the auxiliaries, one, two or a plurality may be used in combination. Examples of thickeners are polyvinyl alcohols, cellulose derivatives or polyacrylic acids, in amounts of, for example, 0.01 to 4 or of 0.05 to 1.5 or of 0.1 to 1 parts by weight, based on 100 parts by weight of solids. Examples of dispersants are sodium hexametaphosphate, sodium tripolyphosphates, or polycarboxylic acids. Examples of antifreeze agents are ethylene glycol or propylene glycol.

Examples of foam inhibitors include silicones. Examples of stabilizers are polyvalent metal compounds such as zinc oxide, zinc chloride or zinc sulfate.

The auxiliaries are preferably used at not less than 0.1% by weight and are preferably selected from crosslinkers, thickeners, rheological additives, resins, plasticizers, defoamers, preservatives, antifreeze agents, and pigment dispersants.

The quality of sound deadener composition can be measured by measurement of the flexural vibrations by the resonance curve method in accordance with ISO 6721-1 and ISO 6721-3. One measure of the vibration-damping effect is the loss factor tan delta. With sound deadener compositions of the invention, the maximum value of the loss factor tan delta is situated preferably in the range from −20 to +70° C. Where two or more different binders are used, there are generally two or more maxima to the loss factor, at not less than two different temperatures. In this case it is preferred for all of the maxima of the loss factor to be situated within the range from −20 to +70° C. Where crosslinkers are used, the values relate to the crosslinked sound deadener composition.

The invention also provides a method for damping oscillations or vibrations of components of vehicles or machines, by
(1) providing a sound deadener composition as described in more detail above, and
(2) applying the sound deadener composition to a component of a vehicle or of a machine, and subjecting it optionally to drying and/or to crosslinking.

Application may take place in a usual way, as for example by brushing, rolling or spraying. The amount applied is preferably from 1 to 7 kg/m² or from 2 to 6 kg/m² after drying. Drying may take place at ambient temperature or, preferably, by application of heat. The drying temperatures are preferably from 80 to 210° C. or from 90 to 180° C. or from 120 to 170° C.

The sound deadener composition may be employed, for example, in vehicles of all kinds, more particularly road-going motor vehicles, automobiles, and rail vehicles, but also in boats, aircraft, electrical machines, construction machines, and buildings.

The invention also provides a substrate at least partly coated with a sound deadener composition as described above.

The sound deadener compositions of the invention have good performance properties in terms of good application qualities, including spray applications, and good vibration-damping qualities, and are notable for a low water absorption capacity and for avoidance of blistering.

EXAMPLES

Substances Used:

| | |
|---|---|
| Laromer ® LR 8887 | monofunctional reactive diluent, comprising trimethylolpropane formal acrylate |
| Laromer ® LR 8907 | reactive diluent, polyester acrylate comprising dipropylene glycol diacrylate |
| Genomer ® 1122 | reactive diluent, comprising monofunctional urethane acrylate |
| Trigonox ® 17-40b-pd | butyl 4,4-di(tert-butylperoxy)valerate |
| Trigonox ® 29-40B-pd | 1,1-di(tert-butylperoxy)-3,3,5-trimethylcyclohexane |

Description of the Mixing Assemblies

Speedmixer:

A Haussschild DAC 400FVZ SpeedMixer is used. This is a rotary mixer which mixes the samples thoroughly without incorporation of air. The rotary speed can be set within a range from 800 to 2750 1/min.

Dissolver-Stirrer:

The apparatus consists of a stirring mechanism, a shaft driven by the mechanism, and a dissolver disk as stirring tool. With this form of mixing, air is incorporated into the sample. The stirring speed can be set in the range of 0-1000 1/min. The dissolver disk is a disk with teeth on its periphery, of the kind known to the expert for the dispersing of resins, for example, in water in the paints and coatings industry.

K Value:

The K value is measured on a 1% by weight strength solution in THF at 21° C. The viscosity measurement is made using a capillary viscometer. The K value is calculated according to the Fikentscher equation from the relative viscosity $\eta_r$:

$\eta_r$=relative viscosity (dynamic viscosity of solution/dynamic viscosity of solvent) and c=concentration by mass of polymer in the solution in g/cm³.

$$K = 1000 \cdot k = 1000 \cdot \frac{1.5 \lg \eta_r - 1 \pm \sqrt{1 + \left(\frac{2}{c} + 2 + 1.5 \lg \eta_r\right) \cdot 1.5 \lg \eta_r}}{150 + 300c}$$

Protocols are found in DIN EN ISO 1628-1:2012-10.

Example 1: Low Molecular Mass Resin, Polymerized in O-Xylene

A polymerization apparatus made up of glass reactor, reflux condenser, stirrer, and nitrogen inlet is charged under a gentle stream of nitrogen with 484.1 g of o-xylene, and this initial charge is heated to 140° C. At 120° C. 40 g of a monomer mixture made up of 456 g of n-butyl acrylate, 160 g methyl methacrylate, 64 g of acrylic acid, and 120 g of dihydrodicyclopentadienyl acrylate are added. At 137° C. 4.5 g of an initiator solution consisting of 10.7 g of tert-butyl perpivalate (75% strength in mineral oil) and 80 g of o-xylene are added, and polymerization is commenced for 3 minutes. Then the remaining 760 g of monomer mixture and 86 g of initiator solution are run in over 3 hours. 15 minutes after the end of the feed, a solution of 2.56 g of tert-butyl perpivalate (75% strength in mineral oil) in 40 g of o-xylene is added over 30 minutes. Thereafter, reduced pressure is applied, and the solvent is removed by distillation at not more than 140° C. and <50 mbar. This is followed by degassing with slow stirring for 1 hour at 140° C. and optimum vacuum.

K value; 1% in THF: 16.7
Zero-shear viscosity at 60° C.: 1670 Pa*s

Example 2: Medium Molecular Mass Resin, Polymerized in Methyl Ethyl Ketone (MEK)

A polymerization apparatus made up of glass reactor, reflux condenser, stirrer, and nitrogen inlet is charged under a gentle stream of nitrogen with 1104 g of MEK, and this initial charge is heated to 80° C. 25 g of a monomer mixture made up of 300 g of n-butyl acrylate, 160 g of methyl methacrylate, 25 g of acrylic acid, and 15 g of dihydrodicyclopentadienyl acrylate are added. When 80° C. have been regained, 2.8 g of an initiator solution consisting of 6.7 g of tert-butyl perpivalate (75% strength in mineral oil) and 50 g of MEK are added, and polymerization is commenced for 3 minutes. Then the remaining 475 g of monomer mixture and 53.8 g of initiator solution are run in over 3 hours. The temperature is subsequently raised to 90° C. and a solution of 6 g of tert-butyl perpivalate (75% strength in mineral oil) in 25 g of MEK is added over 30 minutes. Thereafter, reduced pressure is applied, and the solvent is removed by distillation at not more than 135° C. and <50 mbar. This is followed by degassing with slow stirring for 1 hour at 135° C. and optimum vacuum.

K value; 1% in THF: 27.5
Zero-shear viscosity at 90° C.: 822 Pa*s

Example 3: Low Molecular Mass Resin, Polymerized in O-Xylene

A polymerization apparatus made up of glass reactor, reflux condenser, stirrer, and nitrogen inlet is charged under a gentle stream of nitrogen with 860 g of o-xylene, and this initial charge is heated to 140° C. At 120° C. 50 g of a monomer mixture made up of 600 g of n-butyl acrylate, 330 g of methyl methacrylate, 50 g of acrylic acid, and 20 g of dihydrodicyclopentadienyl acrylate are added. At 137° C. 5.7 g of an initiator solution consisting of 13.3 g of tert-butyl perpivalate (75% strength in mineral oil) and 100 g of o-xylene are added, and polymerization is commenced for 3 minutes. Then the remaining 950 g of monomer mixture and 107.7 g of initiator solution are run in over 3 hours. 15 minutes after the end of the feed, a solution of 3.2 g of tert-butyl perpivalate (75% strength in mineral oil) in 50 g of o-xylene is added over 30 minutes. Thereafter, reduced pressure is applied, and the solvent is removed by distillation at not more than 140° C. and <50 mbar. This is followed by degassing with slow stirring for 1 hour at 140° C. and optimum vacuum.

K value; 1% in THF: 16.8
Zero-shear viscosity at 60° C.: 449 Pa*s
Zero-shear viscosity at 90° C.: 39 Pa*s Example 4: Low Molecular Mass Resin, Polymerized in O-Xylene A polymerization apparatus made up of glass reactor, reflux condenser, stirrer, and nitrogen inlet is charged under a gentle stream of nitrogen with 602 g of o-xylene, and this initial charge is heated to 140° C. At 120° C. 35 g of a monomer mixture made up of 399 g of n-butyl acrylate, 119 g of methyl methacrylate, 105 g of styrene, 56 g of acrylic acid, and 21 g of dihydrodicyclopentadienyl acrylate are added. At 137° C. 3.97 g of an initiator solution consisting of 9.33 g of tert-butyl perpivalate (75% strength in mineral oil) and 70 g of o-xylene are added, and polymerization is commenced for 3 minutes. Then the remaining 665 g of monomer mixture and 75 g of initiator solution are run in over 3 hours. 15 minutes after the end of the feed, a solution of 2.24 g of tert-butyl perpivalate (75% strength in mineral oil) in 35 g of o-xylene is added over 30 minutes. Thereafter, reduced pressure is applied, and the solvent is removed by distillation at not more than 140° C. and <50 mbar. This is followed by degassing with slow stirring for 1 hour at 140° C. and optimum vacuum.

K value; 1% in THF: 19.7
Zero-shear viscosity at 90° C.: 261 Pa*s

Example 5: Low Molecular Mass Resin, Polymerized in O-Xylene

A polymerization apparatus made up of glass reactor, reflux condenser, stirrer, and nitrogen inlet is charged under a gentle stream of nitrogen with 860 g of o-xylene, and this initial charge is heated to 140° C. At 120° C. 50 g of a monomer mixture made up of 600 g of n-butyl acrylate, 350 g of methyl methacrylate, and 50 g of acrylic acid, are added. At 137° C. 5.7 g of an initiator solution consisting of 13.3 g of tert-butyl perpivalate (75% strength in mineral oil) and 100 g of o-xylene are added, and polymerization is commenced for 3 minutes. Then the remaining 950 g of monomer mixture and 107.7 g of initiator solution are run in over 3 hours. 15 minutes after the end of the feed, a solution of 3.2 g of tert-butyl perpivalate (75% strength in mineral oil) in 50 g of o-xylene is added over 30 minutes. Thereafter, reduced pressure is applied, and the solvent is removed by distillation at not more than 140° C. and <50 mbar. This is followed by degassing with slow stirring for 1 hour at 140° C. and optimum vacuum.

K value; 1% in THF: 16.2
Zero-shear viscosity at 60° C.: 415 Pa*s
Zero-shear viscosity at 90° C.: 32 Pa*s Example 6: Preparation of a Mixture of Low Molecular Mass Resin from Example 1 and Reactive Diluents (Laromer® LR 8887 and Laromer® LR 8907)

The resin from example 1 is mixed at 80° C. in a dissolver-stirrer with the Laromers® LR 8887 and LR 8907 in a ratio of 50:40:10 (resin:LR8887:R8907). The mixture is subsequently homogenized in a Speedmixer at 2750 rpm for 1 minute.

Zero-shear viscosity at 23° C.: 19 Pa*s

Example 7: Preparation of a Mixture of Low Molecular Mass Resin from Example 2 and Reactive Diluent (Laromer® LR 8887)

The resin from example 2 is mixed at 80° C. in a dissolver-stirrer with the Laromer® LR 8887 in a ratio of 50:50 (resin:LR8887). The mixture is subsequently homogenized in a Speedmixer at 2750 rpm for 1 minute.

Zero-shear viscosity at 23° C.: 65 Pa*s

Example 8: Preparation of a Mixture of Low Molecular Mass Resin from Example 3 and Reactive Diluent (Laromer® LR 8887)

The resin from example 3 is mixed at 80° C. in a dissolver-stirrer with the Laromer® LR 8887 in a ratio of 50:50 (resin:LR8887). The mixture is subsequently homogenized in a Speedmixer at 2750 rpm for 1 minute.

Zero-shear viscosity at 23° C.: 6 Pa*s

Example 9: Preparation of a Mixture of Low Molecular Mass Resin from Example 3 and Reactive Diluent (Genomer® 1122)

The resin from example 3 is mixed at 80° C. in a dissolver-stirrer with the Genomer® 1122 in a ratio of 50:50 (resin: 1122). The mixture is subsequently homogenized in a Speedmixer at 2750 rpm for 1 minute.

Zero-shear viscosity at 23° C.: 8 Pa*s

Example 10: Preparation of a Mixture of Low Molecular Mass Resin from Example 4 and Reactive Diluent (Laromer® LR 8887)

The resin from example 4 is mixed at 80° C. in a dissolver-stirrer with the Laromer® LR 8887 in a ratio of 50:50 (resin:LR8887). The mixture is subsequently homogenized in a Speedmixer at 2750 rpm for 1 minute.

Zero-shear viscosity at 23° C.: 11 Pa*s

Example 11: Preparation of a Mixture of Low Molecular Mass Resin from Example 5 and Reactive Diluent (Heptadecyl Acrylate)

The resin from example 5 is mixed at 80° C. in a dissolver-stirrer with the heptadecyl acrylate in a ratio of 50:50 (resin:acrylate). The mixture is subsequently homogenized in a Speedmixer at 2750 rpm for 1 minute.

Zero-shear viscosity at 23° C.: 9 Pa*s

Preparation of Sound Deadener Composition A6:

The mixture from example 6 is admixed at 60° C. with 1% (based on the mixture) of initiator (Trigonox® 17-40b-pd) and subjected to mixing in a Speedmixer at 2750 rpm for 1 minute. Then barium sulfate (EWO) and chalk (Omyacarb® 15GU) (in equal weight fractions) are added to the binder (mixture 6) in a ratio of 80:20 (filler:binder), and this mixture is homogenized in a Speedmixer at 2750 rpm for 1 minute.

Preparation of Sound Deadener Compositions A7 to A11:

The mixtures from examples 7 to 11 are admixed at 60° C. with 1% (based on the mixture) of initiator (Trigonox® 29-40B-PD) and subjected to mixing in a Speedmixer at 2750 rpm for 1 minute. Then barium sulfate (EWO) and chalk (Omyacarb® 20BG) in equal weight fractions are added to the binder (mixtures from examples 7 to 11) in a ratio of 80:20 (filler:binder), and this mixture is homogenized in a Speedmixer at 2750 rpm for 1 minute.

Performance Tests

Determination of Vibration Damping (Loss Factor/Tan Delta)

For the purposes of assessing the vibration damping behavior, a measurement is made of the loss factor tan delta at 25° C., in the manner described in WO 2007/034933 (in analogy to ISO 6721-1 and ISO 6721-3). For this purpose, a sheet steel test specimen with a size of 30×300×1.6 mm is coated with the sound deadener composition under test, which is dried at 160° C. for 30 minutes.

The coating rate is approximately 3.0 kg per m$^2$.

Determination of Water Absorption:

The water absorption is determined in a method based on DIN EN ISO 62:2008. For this purpose, films with a thickness of approximately 2 mm and a side length each of 25 mm are produced from the sound deadener compositions prepared. The films are dried first at room temperature (20° C.) for 24 hours, then at 160° C. for 30 minutes, and are each stored for 24 during storage. This increase is determined gravimetrically using a Mettler Toledo AG204 analytical balance.

Blistering:

The sound deadener composition in a thickness of 3 mm with an edge length of 60 mm×100 mm is assessed visually after drying at 160° C. for 30 minutes. The rating scale used in this assessment is as follows:

1: no blisters, 2: 2-3 small blisters, 3: slight lifting of the composition, 4: large blister, dishing of entire composition.

Determination of Zero-Shear Viscosity

The zero-shear viscosity is the limiting value of the viscosity function at infinitely low shear rates. It is measured using an Anton Paar MCR 100 Rheometer (US 200 analysis software) in plate/plate geometry. The samples are measured in oscillatory shear with a low shear amplitude of 10%. Temperature 20°, 60° or 90° C. (as indicated), oscillating frequency ramp log 100-0.1 1/s, measurement slit 0.5 mm, evaluation by Carreau-Gahleitner I, die diameter 25 mm.

The results are summarized in tables 1 to 3.

TABLE 1

Results of the performance tests

| | Sound deadener composition: | A6 | A7 | A8 | A9 | A10 | A11 |
|---|---|---|---|---|---|---|---|
| Vibration damping | tan delta max | 0.12 | 0.13 | 0.12 | 0.19 | 0.13 | 0.09 |
| | FWHM [° C.] | 40 | 45 | 40 | 30 | 40 | 30 |
| | T max [° C.] | 30 | 25 | 20 | 17 | 30 | 15 |
| Water absorption | [after 24 h/7 d in %] | n.d. | 1/2 | 1/2 | 1/2 | 0/1 | 1/2 |
| Blistering | (visual assessment) | 1 | 2 | 1 | 1 | 1 | 1 |

FWHM = full width at half maximum n.d. = not determined

TABLE 2

Zero-shear viscosities of the resins from Examples 1 to 5 (B1 to B5)

| | | B1 | B2 | B3 | B4 | B5 |
|---|---|---|---|---|---|---|
| Zero-shear viscosity of resins B1 to B5 | [at 60° C. in Pa * s] | 1670 | n.d. | 449 | n.d. | 415 |
| | [at 90° C. in Pa * s] | n.d. | 822 | 39 | 261 | 32 | n.d.: not determined

TABLE 3

Zero-shear viscosities of the binder compositions from Examples 6 to 11 (B6 to B11)

| | | B6 | B7 | B8 | B9 | B10 | B11 |
|---|---|---|---|---|---|---|---|
| Zero-shear viscosity of binders B6 to B11 | [at 23° C. in Pa * s] | 19 | 65 | 6 | 8 | 11 | 9 |

The results show that the pure resins (acrylate binders of Examples 1 to 5) are unsuitable as sole binder, on account of their high zero-shear viscosities, for producing a sound deadener composition which is sprayable at room temperature. Only the preparation of binder compositions in accordance with the invention, comprising a mixture of resin and radically polymerizable compound, permits sufficiently low zero-shear viscosities at room temperature (Examples 6 to 11) to enable the realization of sound deadener compositions (A6 to A11) which are sprayable at room temperature.

For the effective damping properties (sum total of height of maximum and full width at half maximum), a combination of the resins for inventive use with the inventive selection of radically polymerizable compounds is critical.

The invention claimed is:

1. A nonaqueous sound deadener composition, comprising:
   (a) at least one nonpulverulent polyacrylate binder having a K value in the range from 10 to 35, measured as a 1% strength solution in tetrahydrofuran at 21° C.;
   (b) at least one inorganic filler; and
   (c) at least one radically polymerizable compound which has at least one radically polymerizable C—C double bond and possesses a boiling point at atmospheric pressure of greater than 160° C.;
   wherein the compound (c) in the polymerized state has a glass transition temperature in the range from −30 to +60° C.

2. The sound deadener composition according to claim 1, wherein the at least one radically polymerizable compound of component (c) has precisely one radically polymerizable C—C double bond to an extent of 50% to 100% by weight, and has two or more radically polymerizable C—C double bonds to an extent of 0% to 50% by weight.

3. The sound deadener composition according to claim 1, wherein the at least one radically polymerizable compound of component (c) is at least one monomer selected from the group consisting of a (meth)acrylate monomer, a vinyl ether monomer, a (meth)acrylate oligomer, a vinyl ether oligomer, a monoalkylene glycol diacrylate, a dialkylene glycol diacrylate, a polyalkylene glycol diacrylate, and a urethane acrylate.

4. The sound deadener composition according to claim 1, further comprising at least one thermally activatable initiator.

5. The sound deadener composition according to claim 1, further comprising at least one film-forming assistant having a boiling point at atmospheric pressure of greater than 160° C., wherein
   the at least one film-forming assistant is present in the sound deadener composition and is present in an amount of less than 10% by weight.

6. The sound deadener composition according to claim 5, wherein the film-forming assistant is at least one member selected from the group consisting of a polyethylene glycol, an oligopropylene glycol ester, and an oligopropylene glycol ether.

7. The sound deadener composition according to claim 1, further comprising at least one organic solvent having a boiling point at atmospheric pressure of less than 120° C., wherein
   the at least one organic solvent is present in the sound deadener composition and is present in an amount of less than 10% by weight.

8. The sound deadener composition according to claim 1, wherein the polyacrylate binder comprises:
   at least 60% by weight of at least one $C_1$ to $C_{10}$ alkyl (meth)acrylate and,
   optionally, at least one further monomer selected from the group consisting of an ethylenically unsaturated, radically polymerizable acid monomer; a vinyl ester of carboxylic acid comprising up to 20 C atoms; a vinylaromatic comprising up to 20 C atoms; an ethylenically unsaturated nitrile; a vinyl halide; a vinyl ether of an alcohol comprising 1 to 10 C atoms; an aliphatic hydrocarbon having 2 to 8 C atoms and one or two double bonds.

9. The sound deadener composition according to claim 1, wherein the polyacrylate binder has a glass transition temperature in the range from −60 to ±80° C.

10. The sound deadener composition according to claim 1, wherein the polyacrylate binder does not have a core-shell morphology.

11. The sound deadener composition according to claim 1, wherein the polyacrylate binder at 130° C. has a zero-shear viscosity of not more than 40 Pa s.

12. The sound deadener composition according to claim 1, wherein the polyacrylate binder comprises, in polymerized form:
   (a1) at least 80% by weight of at least one C1 to C10 alkyl (meth)acrylate; and
   (a2) from 0.5% to 20% by weight from at least one monomer having at least one polar group, the polar group being selected from the group consisting of a carboxylic acid group, a carboxamide group, a pyrrolidone group, a urethane group, a urea group, an anhydride group, a sulfate group, a sulfonate group, a phosphate group, and a phosphonate group.

13. The sound deadener composition according to claim 1, wherein the polyacrylate binder comprises, in polymerized form, methyl (meth)acrylate, at least one C2 to C4 alkyl acrylate, and (meth)acrylic acid, and also, optionally, at least one of allyl methacrylate, dihydrocyclopentadienyl acrylate, and styrene.

14. The sound deadener composition according to claim 1, wherein the polyacrylate binder comprises, in polymerized form:
   (i) 0% to 99% by weight of methyl (meth)acrylate,
   (ii) 0% to 99% by weight of at least one C2 to C10 alkyl acrylate,
   (iii) 0.5% to 15% by weight of (meth)acrylic acid, (iv) 0% to 25% by weight of a polyethylenically unsaturated alkyl acrylate, and
(v) 0% to 30% by weight of styrene.

15. The sound deadener composition according to claim 1, comprising:
(a) 5% to 35% by weight of the at least one nonpulverulent polyacrylate binder,
(b) 40% to 90% by weight of at least one inorganic filler,
(c) 1% to 35% by weight of the at least one radically polymerizable compound,
(d) 0.01% to 10% by weight of initiator,
(e) from 0% to 20% by weight of solvent with boiling point greater than 160° C., and
(f) 0% to 50% by weight of at least one further auxiliary.

16. The sound deadener composition according to claim 15, wherein the at least one inorganic filler is at least one member selected from the group consisting of kaolin, chalk, barium sulfate, carbon black, graphite, talc, a clay mineral, microdolomite, finely ground quartz, and mica, and
the at least one further auxiliary is present in an amount of at least 0.1% by weight and comprises at least one member selected from the group consisting a crosslinker, a thickener, a rheological additive, a resin, a plasticizer, a defoamer, a preservative, an antifreeze agent, and a pigment dispersant.

17. The sound deadener composition according to claim 1, wherein the sound deadener composition is free from organic solvents having a boiling point of less than 120° C. at atmospheric pressure.

18. A method for damping oscillations or vibrations of components of a vehicle or of a machine, the method comprising:
applying a nonaqueous sound deadener composition to a component of a vehicle or of a machine, and, optionally,
drying and/or crosslinking the sound deadener composition;
wherein the nonaqueous sound deadener composition, comprises:
(a) at least one nonpulverulent polyacrylate binder having a K value in the range from 10 to 35, measured as a 1% strength solution in tetrahydrofuran at 21° C.;
(b) at least one inorganic filler; and
(c) at least one radically polymerizable compound which has at least one radically polymerizable C—C double bond and possesses a boiling point at atmospheric pressure of greater than 160° C.

19. A substrate, comprising a sound deadener composition according to claim 1, wherein
the substrate is at least partly coated with the sound deadener composition.

20. A nonaqueous sound deadener composition, comprising:
(a) at least one nonpulverulent polyacrylate binder having a K value in the range from 10 to 35, measured as a 1% strength solution in tetrahydrofuran at 21° C.;
(b) at least one inorganic filler; and
(c) at least one radically polymerizable compound which has at least one radically polymerizable C—C double bond and possesses a boiling point at atmospheric pressure of greater than 160° C.;
wherein the polyacrylate binder has a glass transition temperature in the range from −60 to +80° C.

21. The sound deadener composition according to claim 20, wherein the at least one radically polymerizable compound of component (c) has precisely one radically polymerizable C—C double bond to an extent of 50% to 100% by weight, and has two or more radically polymerizable C—C double bonds to an extent of 0% to 50% by weight.

22. The sound deadener composition according to claim 20, wherein the at least one radically polymerizable compound of component (c) is at least one monomer selected from the group consisting of a (meth)acrylate monomer, a vinyl ether monomer, a (meth)acrylate oligomer, a vinyl ether oligomer, a monoalkylene glycol diacrylate, a dialkylene glycol diacrylate, a polyalkylene glycol diacrylate, and a urethane acrylate.

23. The sound deadener composition according to claim 20, wherein the polyacrylate binder comprises:
at least 60% by weight of at least one $C_1$ to $C_{10}$ alkyl (meth)acrylate and,
optionally, at least one further monomer selected from the group consisting of an ethylenically unsaturated, radically polymerizable acid monomer; a vinyl ester of carboxylic acid comprising up to 20 C atoms; a vinylaromatic comprising up to 20 C atoms; an ethylenically unsaturated nitrile; a vinyl halide; a vinyl ether of an alcohol comprising 1 to 10 C atoms; an aliphatic hydrocarbon having 2 to 8 C atoms and one or two double bonds.

24. The sound deadener composition according to claim 20, wherein the polyacrylate binder does not have a core-shell morphology.

25. The sound deadener composition according to claim 20, wherein the polyacrylate binder comprises, in polymerized form, methyl (meth)acrylate, at least one C2 to C4 alkyl acrylate, and (meth)acrylic acid, and also, optionally, at least one of allyl methacrylate, dihydrocyclopentadienyl acrylate, and styrene.

26. The sound deadener composition according to claim 20, wherein the polyacrylate binder comprises, in polymerized form:
(iv) 0% to 99% by weight of methyl (meth)acrylate,
(v) 0% to 99% by weight of at least one C2 to C10 alkyl acrylate,
(vi) 0.5% to 15% by weight of (meth)acrylic acid,
(iv) 0% to 25% by weight of a polyethylenically unsaturated alkyl acrylate, and
(v) 0% to 30% by weight of styrene.

27. The sound deadener composition according to claim 20, comprising:
(b) 5% to 35% by weight of the at least one nonpulverulent polyacrylate binder,
(b) 40% to 90% by weight of at least one inorganic filler,
(c) 1% to 35% by weight of the at least one radically polymerizable compound,
(d) 0.01% to 10% by weight of initiator,
(e) from 0% to 20% by weight of solvent with boiling point greater than 160° C., and
(f) 0% to 50% by weight of at least one further auxiliary.

28. The sound deadener composition according to claim 20, wherein the sound deadener composition is free from organic solvents having a boiling point of less than 120° C. at atmospheric pressure.

29. A nonaqueous sound deadener composition, comprising:
(a) at least one nonpulverulent polyacrylate binder having a K value in the range from 10 to 35, measured as a 1% strength solution in tetrahydrofuran at 21° C.;
(b) at least one inorganic filler; and
(c) at least one radically polymerizable compound which has at least one radically polymerizable C—C double bond and possesses a boiling point at atmospheric pressure of greater than 160° C.;

wherein the polyacrylate binder at 130° C. has a zero-shear viscosity of not more than 40 Pa s.

30. The sound deadener composition according to claim 29, wherein the at least one radically polymerizable compound of component (c) has precisely one radically polymerizable C—C double bond to an extent of 50% to 100% by weight, and has two or more radically polymerizable C—C double bonds to an extent of 0% to 50% by weight.

31. The sound deadener composition according to claim 29, wherein the at least one radically polymerizable compound of component (c) is at least one monomer selected from the group consisting of a (meth)acrylate monomer, a vinyl ether monomer, a (meth)acrylate oligomer, a vinyl ether oligomer, a monoalkylene glycol diacrylate, a dialkylene glycol diacrylate, a polyalkylene glycol diacrylate, and a urethane acrylate.

32. The sound deadener composition according to claim 29, wherein the polyacrylate binder comprises:
at least 60% by weight of at least one $C_1$ to $C_{10}$ alkyl (meth)acrylate and,
optionally, at least one further monomer selected from the group consisting of an ethylenically unsaturated, radically polymerizable acid monomer; a vinyl ester of carboxylic acid comprising up to 20 C atoms; a vinylaromatic comprising up to 20 C atoms; an ethylenically unsaturated nitrile; a vinyl halide; a vinyl ether of an alcohol comprising 1 to 10 C atoms; an aliphatic hydrocarbon having 2 to 8 C atoms and one or two double bonds.

33. The sound deadener composition according to claim 29, wherein the polyacrylate binder does not have a core-shell morphology.

34. The sound deadener composition according to claim 29, wherein the polyacrylate binder comprises, in polymerized form, methyl (meth)acrylate, at least one C2 to C4 alkyl acrylate, and (meth)acrylic acid, and also, optionally, at least one of allyl methacrylate, dihydrocyclopentadienyl acrylate, and styrene.

35. The sound deadener composition according to claim 29, wherein the polyacrylate binder comprises, in polymerized form:
(vii) 0% to 99% by weight of methyl (meth)acrylate,
(viii) 0% to 99% by weight of at least one C2 to C10 alkyl acrylate,
(ix) 0.5% to 15% by weight of (meth)acrylic acid,
(iv) 0% to 25% by weight of a polyethylenically unsaturated alkyl acrylate, and
(v) 0% to 30% by weight of styrene.

36. The sound deadener composition according to claim 29, comprising:
(c) 5% to 35% by weight of the at least one nonpulverulent polyacrylate binder,
(b) 40% to 90% by weight of at least one inorganic filler,
(c) 1% to 35% by weight of the at least one radically polymerizable compound,
(d) 0.01% to 10% by weight of initiator,
(e) from 0% to 20% by weight of solvent with boiling point greater than 160° C., and
(f) 0% to 50% by weight of at least one further auxiliary.

37. The sound deadener composition according to claim 29, wherein the sound deadener composition is free from organic solvents having a boiling point of less than 120° C. at atmospheric pressure.

38. A nonaqueous sound deadener composition, comprising:
(a) at least one nonpulverulent polyacrylate binder having a K value in the range from 10 to 35, measured as a 1% strength solution in tetrahydrofuran at 21° C.;
(b) at least one inorganic filler; and
(c) at least one radically polymerizable compound which has at least one radically polymerizable C—C double bond and possesses a boiling point at atmospheric pressure of greater than 160° C.;
wherein the polyacrylate binder comprises, in polymerized form:
(a1) at least 80% by weight of at least one C1 to C10 alkyl (meth)acrylate; and
(a2) from 0.5% to 20% by weight from at least one monomer having at least one polar group, the polar group being selected from the group consisting of a carboxylic acid group, a carboxamide group, a pyrrolidone group, a urethane group, a urea group, an anhydride group, a sulfate group, a sulfonate group, a phosphate group, and a phosphonate group.

39. The sound deadener composition according to claim 38, wherein the at least one radically polymerizable compound of component (c) has precisely one radically polymerizable C—C double bond to an extent of 50% to 100% by weight, and has two or more radically polymerizable C—C double bonds to an extent of 0% to 50% by weight.

40. The sound deadener composition according to claim 38, wherein the at least one radically polymerizable compound of component (c) is at least one monomer selected from the group consisting of a (meth)acrylate monomer, a vinyl ether monomer, a (meth)acrylate oligomer, a vinyl ether oligomer, a monoalkylene glycol diacrylate, a dialkylene glycol diacrylate, a polyalkylene glycol diacrylate, and a urethane acrylate.

41. The sound deadener composition according to claim 38, wherein the polyacrylate binder does not have a core-shell morphology.

42. The sound deadener composition according to claim 38, comprising:
(d) 5% to 35% by weight of the at least one nonpulverulent polyacrylate binder,
(b) 40% to 90% by weight of at least one inorganic filler,
(c) 1% to 35% by weight of the at least one radically polymerizable compound,
(d) 0.01% to 10% by weight of initiator,
(e) from 0% to 20% by weight of solvent with boiling point greater than 160° C., and
(f) 0% to 50% by weight of at least one further auxiliary.

43. The sound deadener composition according to claim 38, wherein the sound deadener composition is free from organic solvents having a boiling point of less than 120° C. at atmospheric pressure.

* * * * *